(12) United States Patent
Saito

(10) Patent No.: US 7,465,487 B2
(45) Date of Patent: Dec. 16, 2008

(54) DECORATIVE SHEET AND DECORATIVE MATERIAL

(75) Inventor: Nobuo Saito, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 10/976,612

(22) Filed: Oct. 29, 2004

(65) Prior Publication Data

US 2007/0184250 A1    Aug. 9, 2007

(51) Int. Cl.
 *B32B 3/00*  (2006.01)
 *B32B 5/16*  (2006.01)
(52) U.S. Cl. .................. 428/207; 428/208; 428/324
(58) Field of Classification Search ............... 430/203, 430/204, 293, 253, 254, 256, 257, 259, 944, 430/945; 428/32.6, 32.76, 32.81
 See application file for complete search history.

(56) References Cited

U.S. PATENT DOCUMENTS 3,087,828 A * 4/1963 Linton ................... 106/417
5,322,888 A * 6/1994 Kato et al. .............. 524/783

FOREIGN PATENT DOCUMENTS

| EP | 0649886 A | | 4/1995 |
|---|---|---|---|
| EP | 1 123 791 | * | 8/2001 |
| EP | 1123791 A | | 8/2001 |
| JP | 05140475 A | | 6/1993 |
| JP | 63257637 A | | 10/1998 |
| JP | 2001232660 A | | 8/2001 |
| JP | 2002210907 A | | 7/2002 |
| WO | 9729059 A | | 8/1997 |

* cited by examiner

*Primary Examiner*—Timothy M Speer
(74) *Attorney, Agent, or Firm*—Ladas & Parry LLP

(57) ABSTRACT

The use of a pearl pigment as a decorative material for the interior of automobile parts is known to weaken the weather resistance of these parts. Improved weather resistance is achieved by providing a decorative sheet 10, wherein a pearl ink layer 2 comprising a pearl pigment is provided on a base material sheet 1, and the pearl ink layer comprises: at least a vinyl chloride-vinyl acetate copolymer as a binder resin; and the pearl pigment obtained by coating mica with a titanium dioxide, and further, coating the surface thereof with a metal oxide and/or a metal oxide hydrate of metals other than a titanium such as a zirconium, a silicon and the like. The titanium dioxide is preferably of a rutile type. Moreover, the base material sheet is preferably a resin sheet of an acrylic resin. A decorative material 20 can be obtained by laminating the above mentioned decorative sheet on a surface of a base material 5, which is a resin molded body.

10 Claims, 1 Drawing Sheet

DECORATIVE SHEET AND DECORATIVE MATERIAL

BACKGROUND OF THE INVENTION

1. Field of the Invention

The present invention relates to a decorative sheet having pearl-like brilliance, and a decorative material having this decorative sheet laminated on a base material such as a resin molded body and the like. Particularly, the present invention relates to a decorative sheet and decorative material having excellent weather resistance, suitable for uses requiring high weather resistance performance such as automobile interiors and other uses.

2. Description of the Related Art

Decorative sheets are used in various uses such as construction interior and exterior materials, construction materials, furniture, or automobile interior and exterior materials and the like. Decorative sheets are often required to have weather resistance, paint feeling and the like. In such cases, an acrylic resin sheet excellent in transparency is used as a base material sheet on the front surface side. For example, as a decorative sheet capable of being molded and laminated on the surface of a resin molded item and the like, a decorative sheet and the like having configuration of the following layers laminated in this order (see, Japanese Patent Application Laid-Open (JP-A) No. 2001-232660) can be listed: on the surface side, a transparent acrylic resin sheet; an ink layer having a design expressed using a mixture, of an acrylic resin and a vinyl chloride-vinyl acetate copolymer, as a binder resin; an adhesive layer using a mixture of an acrylic resin and a vinyl chloride-vinyl acetate copolymer as a binder resin; and as a resin sheet on the back side, a resin sheet having a coloring masking property of an ABS resin (acrylonitrile-butadiene-styrene copolymer).

To express a design of a decorative sheet, brilliance such as metal gloss feeling, pearl gloss feeling and the like, are required in some cases. For imparting such brilliance to a decorative sheet, a metal vacuum evaporation layer is provided in some cases. However, brilliant pigments such as a metal powder, pearl pigment and the like are often contained in an ink layer, resin sheet and the like is contained in the ink layer, the resin sheet or the like (see, JP-A No. 2002-210907) in many cases. As the brilliant pigment to be used, a powder of a metal such as aluminum and the like is used when a metal gloss feeling is expressed as a brilliance property, a pearl pigment such as titanium dioxide coated mica and the like is use when a pearl gloss feeling is expressed, in general.

Though a pearl gloss feeling gives a luxurious feeling as compared with a metal gloss feeling, when titanium dioxide coated mica which is a general pearl pigment is used, there occurs a problem of deterioration of the weather resistance. When the weather resistance is deteriorated, there will be a failure that a decorative sheet or decorative material is peeled off at a pearl ink layer containing an added pearl pigment. When the weather resistance is deficient, measures are usually taken that a resin excellent in the weather resistance such as an acrylic resin and the like is used as the resin of a base material sheet, or an ultraviolet absorber or a light stabilizer such as a bindered amine-based radical scavenger and the like is added in the resin of a base material sheet. However, these countermeasures are limited since the light stabilizer tends to bleed out from the surface to cause whitening and the like.

For evaluation of the weather resistance, an artificial accelerated exposure test imitating an atmospheric exposure test at laboratory level is common, since a result of good reproducibility is obtained in a shorter period of time. And as its test light source, a sunshine carbon arc lamp is often used for a long time. However, a xenon arc lamp gives a result closer to weather resistance under natural environments than the sunshine carbon arc lamp. Therefore, particularly currently, a test by a xenon arc lamp tends to be adopted when weather resistance is evaluated more precisely. For example, there may be a case, though the weather resistance performance evaluated by the sunshine carbon arc lamp is excellent, the weather resistance performance is poor when evaluated by the xenon arc lamp.

SUMMARY OF THE INVENTION

An object of the present invention is to obtain a good weather resistance in a decorative sheet using a pearl pigment even if it is evaluated by a xenon arc lamp. Moreover, another object of the present invention is to provide a decorative material obtained by laminating such a decorative sheet on a base material such as a resin molded item and the like, for example, a decorative material for vehicles such as automobile interior parts and the like.

For solving the above mentioned problems, a decorative material of the present invention has a configuration that, a pearl ink layer comprising a pearl pigment is provided on a base material sheet, and the pearl ink layer comprises: at least a vinyl chloride-vinyl acetate copolymer as a binder resin; and the pearl pigment obtained by coating mica with a titanium dioxide, and further, coating the surface thereof with a metal oxide and/or a metal oxide hydrate of metals other than a titanium such as a zirconium, a silicon and the like.

In the titanium dioxide coated mica conventionally used as a pearl pigment promotes a photodecomposition of a binder resin, because the titanium dioxide on its outermost surface acts as a photocatalyst. However, by having the above mentioned configuration, even though the sheet has a pearl gloss feeling, the weather resistance can be improved by coating the surface of the titanium dioxide with other substance in order to inhibit the action. Further, even when evaluated by a xenon arc lamp, the weather resistance can be improved.

Moreover, the decorative sheet of the present invention has a configuration in which the titanium dioxide is of a rutile type in the above mentioned configuration.

By such a configuration, the photocatalyst action of the titanium dioxide itself can be decreased as compared with anatase type, and resultantly, the weather resistance can be further improved.

In either of the above mentioned configuration, the decorative sheet of the present invention further has a configuration in which, the metal of the metal oxide and/or metal oxide hydrate is the zirconium.

By having such configuration, the weather resistance can be securely improved.

In any of the above mentioned configuration, the decorative sheet of the present invention further has a configuration in which, the base material sheet is a resin sheet of an acrylic resin.

By having such configuration, the weather resistance is improved also from the standpoint of a resin used for the material of the base material sheet.

Moreover, the decorative material of the present invention has a configuration in which any one of the above mentioned decorative sheet is laminated on the surface of a resin molded body.

This configuration is one preferable application example of the above mentioned decorative sheet, and by adopting such a configuration, the effect of the above mentioned decorative sheet can be imparted to items having shape other than sheet such as a plate, a three dimensional body and the like, so that the weather resistance of the decorative material having a pearl gloss feeling can be improved even in the case of evaluating by a xenon arc lamp and the like.

In the above mentioned configuration of the decorative material, the decorative material of the present invention further has a configuration in which, the resin of the resin molded body is made of an ABS resin, polycarbonate resin or of both these resins, and the base material sheet of the decorative sheet is a resin sheet of an acrylic resin.

This configuration is one preferable embodiment of the above mentioned decorative material, as the decorative material using the resin which is relatively common as a resin of a resin molded body, can impart a pearl gloss feeling together with the weather resistance.

One preferable embodiment of the decorative material of the present invention is any one of the above mentioned decorative materials, and used as a decorative material for vehicles.

This configuration shows preferable applications of any one of the above mentioned decorative materials, and shows, for example, that a pearl gloss feeling can be imparted together with the weather resistance, as a decorative material for automobile interiors.

(1) According to the decorative sheet of the present invention, even if mica coated with titanium dioxide is used as a pearl pigment, (since its surface is further coated with a metal oxide and/or metal oxide hydrate of metals other than titanium) photodecomposition of a binder resin by the photocatalysis action of titanium dioxide is inhibited, and weather resistance can be improved even if a pearl gloss feeling is imparted. Also, when evaluated by a xenon arc lamp, the weather resistance can be improved.

(2) Further, when titanium dioxide is of a rutile type, the weather resistance can be further improved as compared with that of an anatase type.

(3) When the metal of the above mentioned metal oxide and/or metal oxide hydrate is a zirconium, the weather resistance can be securely improved.

(4) When the base material sheet is a resin sheet of an acrylic resin, the weather resistance is improved also from the standpoint of the resin material of a resin material sheet.

(5) According to the decorative material of the present invention, each effect of the above mentioned decorative sheet can be obtained, and the weather resistance can be improved even if a pearl gloss feeling is imparted, and a decorative material obtained by laminating a decorative sheet on a resin molded body, of an ABS resin, polycarbonate resin and the like, can be made suitable for automobile uses. Further, also when evaluated by a xenon arc lamp, the weather resistance can be improved.

DESCRIPTION OF THE PREFERRED EMBODIMENTS

Embodiments of the present invention will be explained below.

[Summary]

Figure 1A:
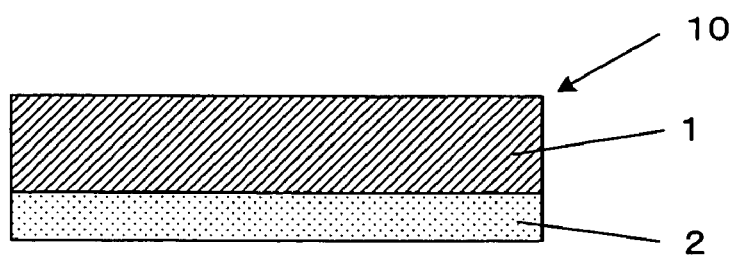
FIGS. 1A to 1D are sectional views showing embodiments of the decorative sheets and decorative material according to the present invention.
Figure 1B:
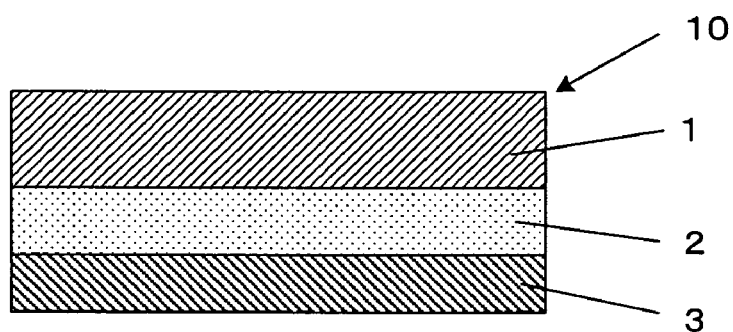
Figure 1C:
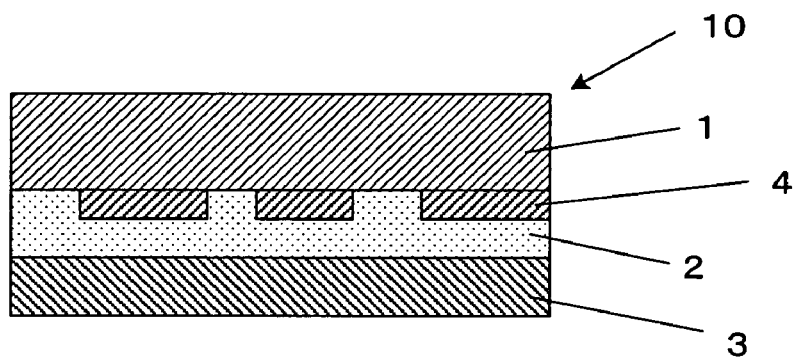

First, FIGS. 1A to 1C are sectional views showing some embodiments of decorative sheet of the present invention and a decorative material obtained by laminating the decorative sheet on a base material such as a resin molded body and the like.

FIG. 1A shows a basic configuration example of a decorative sheet 10, in which on one surface of a base material sheet 1 made of a transparent acrylic resin sheet and the like, a pearl ink layer 2, comprising a pearl pigment peculiar to the present invention, is formed. This pearl pigment is a pearl pigment obtained by coating mica with a titanium dioxide, and further, coating the surface thereof with a metal oxide and/or metal oxide hydrate of metals other than a titanium such as a zirconium, a silicon and the like. It should be understood that, a pearl ink layer may be solid on the whole surface or formed in a pattern of a design.

Figure 1D:
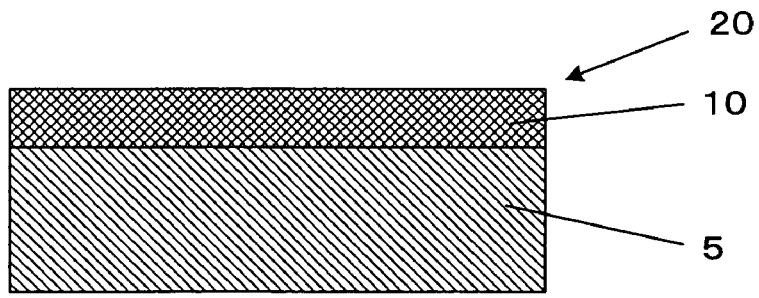

A decorative sheet 10 shown in FIG. 1B is a configuration example in which an adhesive layer 3 is further formed on (lower part of the drawing) the pearl ink layer 2, in the configuration of FIG. 1A. Moreover, a decorative sheet 10 shown in FIG. 1C is a configuration example in which design layers 4, formed of an ink comprising no pearl pigment, are provided in between the base material sheet 1 and the pearl ink layer 2. FIG. 1D is a sectional view showing one embodiment of a decorative material 20 obtained by laminating the decorative sheet 10, for example as shown in FIGS. 1A to 1C, on a base material 5 such as a resin molded body and the like made of an ABS resin and the like.

[Pearl Ink Layer]

The pearl ink layer 2 is an ink layer containing a pearl pigment. As the pearl pigment, in the present invention, a mica based pearl pigment is used, which is obtained by not only coating the surface of mica with titanium dioxide like conventional titanium dioxide coated mica, but further coating its surface with a metal oxide and/or metal oxide hydrate of metals other than titanium such as zirconium, silicon, aluminum, cerium and the like. The coating amount of a metal oxide and/or metal oxide hydrate is about 4 to 20 wt % based on the total weight of the pearl pigment. By this, photodecomposition and deterioration of a binder resin of the pearl ink layer, due to the photocatalysis action of titanium dioxide on the surface, which arises in the conventional titanium dioxide coated mica can be inhibited. As a result, substantial solutions can be provided to the cause of the decrease in the weather resistance.

In order to coat the surface, after being coated with the titanium dioxide, further with the metal oxide or metal oxide hydrate of a metal such as zirconium, silicon and the like, or with both the metal oxide and the metal oxide hydrate thereof, a known method, for example, in which these are deposited on the surface from the corresponding metal salt liquid, may be adopted. In the case of zirconium, the metal oxide hydrate is a zirconium dioxide hydrate. And this is also called zirconium hydroxide.

As the titanium dioxide to be coated on the surface of mica, that of a rutile type is more preferable than that of an anatase type. The reason for this is that the photocatalysis action of the rutile type is smaller than the anatase type (anatase type: 3.2 eV, rutile type: 3.0 eV) because the band gap is small. As a result, the promoting action of photo-deterioration of the binder resin is smaller, and weather resistance will be improved.

To improve physical properties such as dispersion stability and the like, the surface of the above mentioned specific pearl pigment may further be coated with an organic coupling agent. As the organic coupling agent, for example, a silane coupling agent is used. As the silane coupling agent, conventionally known agents may be appropriately selected and used depending on the applications and the like.

The particle size of the pearl pigment may be determined appropriately depending on the required pearl design, transparency and the like. For example, it is about 5 to 25 μm. The shape of the pearl pigment has the same scale-like shaped foil same as that of usual pearl pigments.

The content of the pearl pigment may also be appropriately determined depending on the required pearl design and the like. For example, it is about 5 to 60 wt % based on the resin component.

The thickness of the pearl ink layer, containing the specific pearl pigment as described above, may be an appropriate thickness depending on the required pearl design and the like. For example, it is about 1 to 10 μm.

The layer positional relationship of the pearl ink layer and the base material sheet is not particularly limited in basic. For example, any one of the front surface, rear surface, front and rear surfaces, and inner surface (in the case of multilayered base material sheet) of the base material sheet may be adopted. However, from the standpoint of the weather resistance, it is more preferable that the base material sheet is on the observation side (sunlight side) since the pearl ink layer can be protected from light by the base material sheet, and in this respect, rear surface or inner surface of the base material sheet is more preferable than the front surface.

As the binder resin of the pearl ink layer, appropriate resins such, as urethane resins, polyester resins, acrylic resins and the like, may be used in basic depending on the layer material such as the material resin of the base material sheet and the like. However, in the present invention, at least a vinyl chloride-vinyl acetate copolymer is used. Though the vinyl chloride-vinyl acetate copolymer may be used as a binder resin by itself, in view of adhesion and the like, it is preferable that the copolymer is used together with other resins, for example, to be used as a mixed resin with an acrylic resin and the like. The vinyl chloride-vinyl acetate copolymer is particularly used in the present invention because of the good adhesion with various resins such as, for example, an acrylic resin and the like.

The vinyl chloride-vinyl acetate copolymer is a binder resin that the effect of improving the weather resistance of the specific pearl pigment is easily manifested remarkably in a weather resistance test by a xenon arc lamp. The reason for this is that light with wavelength of 364 nm has a tendency to deteriorate the vinyl chloride-vinyl acetate copolymer, and the xenon arc lamp contains components of the wavelength in larger amount than a sunshine carbon arc lamp. In this respect, an acrylic resin contains no such weak light components and need not to be concerned, while the vinyl chloride-vinyl acetate copolymer has considerable physical properties from the standpoint of adhesion and the like. Even if this vinyl chloride-vinyl acetate copolymer is used, such a remarkable function and effect, that the weather resistance in the weather resistance test by the xenon arc lamp can be improved, can be obtained in the present invention.

Formation of the pearl ink layer may be conducted by known forming methods such as a printing method, coating method and the like, and in the case of forming a solid layer on the entire surface, either of the above method can be used. Though the pearl ink layer 2 shown in the examples of the decorative sheet in FIGS. 1A to 1C are drawn as solid layers on the entire surface, these are concept diagrams for explanation, and layers in the form of a pattern are also included.

For adjusting its physical properties, various additives such as coloring agents, fillers, ultraviolet absorbers, and light stabilizers such as a hindered amine-based radical scavenger and the like are appropriately added to the pearl ink layer as necessity.

[Base Material Sheet]

The base material sheet 1 is not particularly limited basically, and a resin sheet, paper, metal foil and the like corresponding to the uses may be appropriately used. However, when the base material sheet is placed on the observation side of the pearl ink layer, transparency is required. When the decorative sheet is drawn by vacuum molding, discharge mold decorating and the like, moldability is also necessary. Typical examples of such a base material sheet include resin sheets made of thermoplastic resins.

Examples of the thermoplastic resin used for the resins sheet include polyolefin-based resins such as polyethylene, polypropylene, polymethylpentene, polybutene, ionomer, ethylene-propylene copolymer, ethylene-propylene-butene copolymer, olefin-based thermoplastic elastomer and the like, polyester resins such as polybutylene terephthalate, polyester-based thermoplastic elastomers, complete amorphous polyester and the like, acrylic resins such as polymethyl(meth)acrylate, polybutyl(meth)acrylate, methyl(meth)acrylate-butyl(meth)acrylate copolymer, styrene-methyl (meth)acrylate copolymer and the like [(meth)acrylic means acrylic or methacrylic], polycarbonate resins, polystyrene resins, vinyl chloride resins and the like.

Among the above, an acrylic resin is one of the preferable resins due to excellent transparency and weather resistance. The reason for this is that design rich in luxurious feeling such as surface gloss and the like, or painting feeling can be imparted by the excellent transparency of the acrylic resins. Moreover, the acrylic resins also have a merit that surface physical properties such as the weather resistance and scratch resistance and the like are also improved as compared with a case of using a polyolefin-based resin or the like.

For adjusting its physical properties, various additives such as lubricants, friction reducing agents, fillers, coloring agents, ultraviolet absorbers, and light stabilizers such as a hindered amine-based radical scavenger and the like are appropriately added to the resin sheet as necessity.

In the case of the resin sheet, the thickness may be appropriately adjusted depending on cost, moldability, design (painting feeling) and the like, and it is usually about 30 to 200 μm.

[Adhesive Layer]

An adhesive layer 3 is appropriately provided, if necessary, on the surface of an adhesive body side, for increasing adhesive force in adhering and laminating the decorative sheet on the adhesive body such as the base material and the like [see, FIG. 1B]. As the adhesive layer, known adhesives maybe used depending on the uses, and for example, thermoplastic resins such as a vinyl acetate resin, vinyl chloride-vinyl acetate copolymer, thermoplastic polyester resin, polyamide resin, ionomer, chlorinated polyolefin resin, thermoplastic urethane resin and the like, thermo-setting resins such as phenol resins, epoxy resins and the like, or rubber-based resins and the like are used. The adhesive layer can be formed by known printing or coating methods. The thickness of the adhesive layer is not particularly limited. For example, it is about 5 to 20 μm.

[Design Layer]

A design layer 4 is the ink layer containing no pearl pigment and on which a design is expressed. The design may be a woody pattern or the like, or the entire surface may be of a solid pattern. Though the design layer is appropriately provided as necessity, it is usually provided for improving the design. Also, the design layer may be formed by known printing or coating methods (in the case of the entire surface is of a solid pattern) like the pearl ink layer. The binder resin of the design layer is the same as that of the pearl ink layer so that further explanations are omitted. The design layer usually contains a coloring agent, and may also contain brilliant pigments other than the pearl pigment, that is, metal pigments such as a metal powder and the like. As the coloring agent, known coloring agents may be appropriately used.

[Base Material]

When the decorative sheet as described above is laminated, appropriately using an adhesive, on the base material of resin, wood and the like, the decorative material 20 as shown in FIG. 1D is obtained. The base material 5 is not particularly limited, and conventionally known various base materials are used depending on the uses. A method of laminating the decorative sheet and the base material is also not particularly limited, and conventionally known various laminating methods may be appropriately adopted. For example, in a discharge mold decorating method, the decorative sheet can be molded and laminated on a surface of a three dimensional resin molded body. Regarding molding of the decorative sheet, a discharge molding mold and a vacuum molding mold can be used together, or a sheet can be molded in a vacuum molding-dedicated mold, and then, the molded decorative sheet can be installed in the discharge molding mold and be discharge molded. The latter is one kind of an insert molding.

The resin of the resin molded body is not particularly limited, and conventionally known resins depending on the uses are appropriately selected and used. For example, for vehicle uses such as automobile interiors and the like, an ABS resin, polycarbonate resin, ABS/polycarbonate mixed resin are typically used, and additionally, polypropylene resins and the like are also used.

[Uses of Decorative Sheet and Decorative Material]

The uses of the decorative sheet and decorative material of the present invention are not particularly limited, and the uses requiring the weather resistance are particularly preferable since the property can be utilized. Needless to say, the present invention can be preferably be used in the uses in which a pearl gloss feeling is required as design. Specifically, automobile uses such as automobile interiors such as a dashboard panel, door panel, lower panel and the like, automobile exteriors such as a car body, mole and the like are suitable examples. Mentioning examples other than automobile uses, construction uses such as a window frame (sash), door frame, door, wall plate, floor plate, wainscot panel, veranda, roof surface material, shelf, gate, gate pillar, door guard and the like, and furniture uses such as a desk, chest of drawers and the like.

EXAMPLES

The present invention will be further explained in detail by the following examples and comparative examples.

Example 1

The decorative sheet 10 having a configuration as shown in FIG. 1B was produced as described below.

First, a transparent colorless resin sheet having a thickness of 125 μm made PMMA (polymethyl methacrylate) was prepared as the base material sheet 1. On the surface to be used as a rear side of this base material sheet, the below mentioned ink was gravure-printed so as to form the pearl ink layer 2 of 2 μm when dried (also in the following procedures) with the entire surface being of a solid pattern. The ink used for the above pearl ink layer comprises: based on 15 parts by weight of a binder resin, of a mixed resin containing a vinyl chloride-vinyl acetate copolymer and an acrylic resin at a weight ratio of 1:1; 15 parts by weight of a pearl pigment, obtained by coating the surface of mica with rutile type titanium dioxide, zirconium dioxide and silane coupling agent in this order; 3 parts by weight of a dispersion stabilizer and plasticizer in total; and 67 parts by weight of a solvent. Subsequently, an adhesive layer 3 of the vinyl chloride-vinyl acetate copolymer having a thickness of 2 μm was also formed by gravure printing on the pearl ink layer, thus producing a desired decorative sheet 10 as shown in FIG. 1B.

Further, this decorative sheet 10 was laminated on the base material sheet 5, which is a resin molded body made of an ABS resin, by softening by vacuum molding by heating with a radiation heating type heating panel at 340° C. on an discharge molding mold (female mold) acting also as a vacuum molding mold, then, an ABS resin was discharge molded under conditions of a mold temperature of 50° C. and an discharge temperature of 235° C. Thus, a desired decorative material 20, as shown in FIG. 1D, was produced.

Example 2

A desired decorative material 20 as shown in FIG. 1D was produced, by laminating on the base material 5 of a resin molded body, in the same manner as in Example 1 except that, in producing a decorative material using the decorative sheet produced in Example 1, vacuum molding of the decorative sheet was conducted in a dedicated vacuum molding mold, then, an ABS resin was filled into an discharge molding mold and was discharge molded.

Comparative Example 1

A decorative sheet and a decorative material were produced in the same manner as in Example 1 except that a pigment, obtained by only coating the surface of mica with rutile type titanium dioxide, was used as the pearl pigment used in the pearl ink layer in Example 1.

Comparative Example 2

A decorative sheet and a decorative material were produced in the same manner as in Example 1 except that a pigment, obtained by only coating the surface of mica with anatase type titanium dioxide, was used as the pearl pigment used in the pearl ink layer, in Example 1.

Comparative Example 3

A decorative material was produced in the same manner as in Example 2 except that a decorative material was produced using the decorative sheet in Comparative Example 1 instead of the decorative sheet in Example 1, in Example 2.

Comparative Example 4

A decorative material was produced in the same manner as in Example 2 except that a decorative material was produced using the decorative sheet in Comparative Example 2 instead of the decorative sheet in Example 1, in Example 2.

[Performance Evaluation]

The weather resistance of the decorative materials produced in the examples and comparative examples was evaluated by an artificial accelerated exposure test using a xenon arc lamp. The testing conditions were: a black panel temperature of 89° C.; a humidity of 50 RH %; continuous irradiation (only irradiation with light, no rain): and an irradiating time of 500 hours. After the test, (cross cut) adhesion was evaluated by a cross cut tape method, and an adhesive cellophane tape was stuck on 100 (10 longitudinal×10 lateral) squares formed with a utility knife, then, peeled off quickly. When the number of squares remaining without peeling off with the tape was 100 (100/100), it was evaluation as "good", and when at least one square was peeled off (99/100 or less), it was evaluation as "no good".

As a result, in both of the examples, adhesion was good, and the weather resistance evaluated by the xenon arc lamp test was good, as shown in Table 1. However, in all of the comparative examples, adhesion was no good, and sufficient weather resistance could not be obtained.

TABLE 1

RESULTS OF PERFORMANCE EVALUATION

| | Cross cut adhesion | Weather resistance |
| --- | --- | --- |
| Example 1 | 100/100 | Good |
| Example 2 | 100/100 | Good |
| Comparative Example 1 | 38/100 | No good |
| Comparative Example 2 | 11/100 | No good (very poor) |
| Comparative Example 3 | 38/100 | No good |
| Comparative Example 4 | 11/100 | No good (very poor) |

What is claimed is:

1. A decorative sheet, wherein a pearl ink layer comprising a pearl pigment is provided on a base material sheet, and the pearl ink layer comprises: at least a vinyl chloride-vinyl acetate copolymer as a binder resin; and a pearl pigment obtained by coating mica with a layer containing titanium dioxide, and further, coating the surface thereof with a metal oxide and/or a metal oxide hydrate of metals other than titanium, and wherein an adhesive layer comprising a vinyl chloride-vinyl acetate copolymer is formed on the pearl ink layer so as to be provided as an outermost layer.

2. The decorative sheet according to claim 1, wherein the metal of the metal oxide and/or metal oxide hydrate is zirconium.

3. The decorative sheet according to claim 1, wherein the base material sheet is a resin sheet of an acrylic resin.

4. The decorative material comprising the decorative sheet according to claim 1 laminated on the surface of a resin molded body.

5. The decorative material according to claim 4, wherein the resin of the resin molded body is made of an ABS resin, polycarbonate resin or of both these resins, and the base material sheet of the decorative sheet is a resin sheet of an acrylic resin.

6. The decorative material according to claim 5, wherein the decorative material is used for vehicles.

7. The decorative material according to claim 4, wherein the decorative material is used for vehicles.

8. The decorative sheet according to claim 1, wherein the pearl pigment is further coated with a silane coupling agent.

9. The decorative sheet according to claim 8, wherein a coating amount of the metal oxide and/or metal oxide hydrate is 4 to 20 wt % based on a total weight of the pearl pigment.

10. The decorative sheet according to claim 1, wherein a coating amount of the metal oxide and/or metal oxide hydrate is 4 to 20 wt % based on a total weight of the pearl pigment.

* * * * *